United States Patent [19]

Cogley, Jr.

[11] Patent Number: 4,893,312

[45] Date of Patent: Jan. 9, 1990

[54] COMPACT, REAL TIME TAPE DRIVE SYSTEM

[75] Inventor: John R. Cogley, Jr., Covina, Calif.

[73] Assignee: Qualstar Corporation, Chatsworth, Calif.

[21] Appl. No.: 185,793

[22] Filed: Apr. 25, 1988

[51] Int. Cl.$^4$ ............................................. G11B 20/18
[52] U.S. Cl. .................................................. 371/37.8
[58] Field of Search ....................... 371/37, 38; 360/47, 360/53

[56] References Cited

U.S. PATENT DOCUMENTS 3,798,597 3/1974 Frambs et al. ..................... 371/37
4,052,698 10/1977 Ragle ................................. 371/38

OTHER PUBLICATIONS

IBM Article, "Magnetic Tape Coding", by A. M. Patel and S. J. Hong, dated Nov. 1974, pp. 580 through 588.

Primary Examiner—Jerry Smith
Assistant Examiner—Stephen M. Baker
Attorney, Agent, or Firm—Poms, Smith, Lande & Rose

[57] ABSTRACT

A nine track digital tape system operating in accordance with a feedback shift register redundancy scheme, includes in both the encoding and writing section and in the reading and error correction section, arrangements for shifting successive bytes of information by one digit place, and adding the shifted bytes, to provide a "low product" and a "high product", constituting an address or "pointer" to a modifier table, from which a modifier value is obtained to be added to the "low product". In the error correction circuitry, additional tables, using a sample parity error vector and an identification of the columns in which errors occur, as "pointers", provide data which is used to calculate error correction vectors. Instead of using feedback registers, and complex decoding hardware, the circuitry obtains the same result as would have been obtained by the hardware, in a unique manner, to provide a simple, high speed, error correction system.

20 Claims, 7 Drawing Sheets

FIG. 6 WRITE CIRCUITRY

COMPACT, REAL TIME TAPE DRIVE SYSTEM

FIELD OF THE INVENTION

This invention relates to tape drives for storing digital information, and for detecting and correcting errors in the stored data.

BACKGROUND OF THE INVENTION

In magnetic tape digital storage systems it has been proposed to provide error detection and correction for successive blocks of digital information by the use of a parity check bit for each parallel byte of information, and an additional byte of error correction information calculated from the information bits in the block of data. A widely used error correction configuration and circuitry for its implementation are disclosed in an article entitled *Magnetic Tape Coding,* by A. M. Patel and S. J. Hong, IBM Journal of Research and Development, pages 579-588, Nov. 1974.

In the system described in the above-identified article, seven bytes of basic information with each data byte including eight bits of information, are initially provided on a parallel basis. A simple parity bit is then provided for each data byte, so that we now have seven groups of nine bits each to be recorded on the tape. An eighth, nine-bit error correction "byte" is then formed as a polynomial function of the other seven "bytes", and the eighth byte is recorded on the tape to complete the group.

To form the eighth byte, the article cited above discloses, in FIG. 7 thereof, the use of an eight stage feedback shift register having "Exclusive OR" circuits interconnecting each stage of the shift register and at the output thereof, and with the output of the last stage of the shift register coupled back to the first stage thereof, and to the Exclusive OR circuits at the input to the fourth, fifth, and sixth stages of the shift register. Incidentally, an Exclusive OR circuit is defined as a logic circuit which provides an output when an odd number of its inputs are energized.

The respective bits of each of the successive bytes of input data are applied to the Exclusive OR circuits, along with the output from the prior stage of the shift register and the feedback digital signal from the output of the last stage of the shift register, with this last mentioned feedback signal only going to some of the Exclusive OR circuits. Following the receipt of the seven successive bytes of information from each block of data, the output from the eight shift register stages forms an error check code, ECC, which is added as the eighth byte to the previous seven bytes of data. A simple parity check bit is added to each of the eight bytes to give eight "bytes" of nine bits each which may either be applied to the nine track tape directly or following conversion to a run-length limited code.

When digital information is taken off the tape, each nine bit "byte" is checked for parity, giving an eight bit parity "vector", for the eight byte block of binary digits. If this parity vector entirely 0's, this would give a preliminary indication that there were no errors, actually that there was not an even number of errors in any one of the eight bytes of transferred information. The error correction code forming the eighth byte of the corrected code may then be recalculated from the first seven transmitted bytes and subtracted from the transmitted eighth ECC byte, or each bit of the two bytes is applied to an Exclusive OR circuit, to confirm that there is no error, if this error "syndrome" is zero.

Now, if the parity vector and/or the error syndrome is not all zeros, some errors are apparently present in the block of data.

The system as described in the article cited above is capable of correcting errors in two tracks of data, with these tracks having been identified by pointers in accordance with known techniques, by determining the phase shift of recorded data, or other techniques. Complicated circuitry including a shift register and a series of Exclusive OR gates may then be employed, as described in the above-identified article, to obtain correction vectors for each of the two tracks in error, and these tracks can then be corrected.

Shortcomings with the system as described above and in the conventional hardware implementations thereof, include the very large number of integrated circuits, normally more than 500, which are used in the system implementation. The cost of such systems is necessarily high and the weight of such prior art systems is usually over ninety pounds.

It has also been proposed to implement the encoding and decoding steps of the hardware by microcomputer circuitry, which follows the hardware implementation on a step-by-step basis. However, the hardware steps involving the successive Exclusive OR, and shift register operations, and including many conditional operations, is very time-consuming when accomplished by a microcomputer; and such circuitry normally cannot and does not correct errors in a continuous, on-line basis.

Accordingly, principal objects of the present invention involve reducing the number of components, and the size and weight of the components, and the size and weight of the complete tape drive system, and accomplishing error correction functions on a real-time, on-line basis.

SUMMARY OF THE INVENTION

In accordance with the present invention, the foregoing objectives are achieved by a microprocessor implementation of the encoding and decoding functions, as outlined hereinabove, and employing simplified algorithms which are convenient for a microprocessor to implement, together with "Look-Up" tables stored in Read Only Memories, to accomplish the encoding and decoding functions.

More specifically, concerning the encoding arrangements, the parity bit for each eight bit byte is calculated in a normal manner and added to each eight bit byte to form the 9-bit "bytes".

Concerning the development of the eight bit error correction byte, a product is formed by offsetting the successive information bytes of the basic data block by one bit, and adding the resultant columns, modulo 2. The result is a product which can be separated into an eight bit "low" portion of the product and a seven bit "high" portion of the product.

Recognizing that the seven bits of the high portion of the product can only have 128 values (two raised to the seventh power), reference is now made to a table, designated the M Table (M for "Modifier"), using the high portion of the product as the address, and the resultant number from the table is added to the low portion of the product to give the error correction code or ECC byte.

In this regard, the inventor has determined that the same value from the look-up table will always give the correct ECC byte, when it is added to the low portion of the product. This is a result of the cyclic nature of the output from the feedback shift register by which the error correction code was originally formed. The 9×8 bit array is then completed by determining the parity check bit for the 8-bit ECC byte.

Now, turning to the reading section, consideration will be given to the detection and correction of errors.

Initial, relatively simple steps involve separately checking each byte of 9 bits for parity, and obtaining an eight bit parity vector. Of course, if there are no errors in the block of data, the parity check vector will be all zeros. Conversely, however, if the parity vector is all zeros, this does not necessarily mean that there are no errors, as two errors in one 9-bit byte of incoming data, for specific example, would produce a corresponding zero bit relating to that erroneous byte of data, in the 8-bit parity vector.

An identification is also made of the two columns or tracks of data in which errors are most likely to have occurred. This may be accomplished in known ways, by checking the departure of recorded bits or magnetic transitions from their standard or optimal positions on the tape.

Now, proceeding to steps relating to the improvements, in accordance with the invention, relating to the error detection and correction, the seven data bytes and the one error correction byte, of eight bits each, as derived from the nine track tape, are successively shifted and added, modulo two, much as in the encoder, to provide a low partial product, termed the "syndrome Mod 2" and a high partial product, constituting the modifier table address, or M Table pointer. The value from the 128 entry M Table is then added to the syndrome Mod 2 to produce the syndrome, which may be thought of as representing the pattern of errors in the vertical direction (along a particular bit position of each of the data bytes).

In the event the syndrome is all zeros, and if the parity vector is also all zeros, these results indicate that there are no errors in the block of data.

Assuming that some bits in the transmitted data have been disrupted, in two separately identified columns designated Ei and Ej, then the error vector or the syndrome, and usually both, will not be all zeros. Incidentally, Ei represents the lower of the two columns which are in error, and Ej is the higher, and each is a number from 0 to 7. To correct disrupted data in the block, the following steps will be undertaken:

1. First, using the error vector as a pointer, a value is obtained from the V Table, and this value is increased by Ei, a number representing the column of lowest order errors, giving a certain XiV Table pointer value.

2. Using the XiV Table pointer value, we proceed to the XiV Table and obtain an XiV value. Incidentally, steps 1 and 2 could be accomplished with a single table designated Y, but it would have to have several times the number of entries in the combined Tables V and XiV, which have been simplified as a result of the cyclic nature of the error correction patterns.

3. The syndrome is then added to the XiV value.

4. The next step is to obtain a column identification number, designated the K value, determined by the two columns Ei and Ej where errors are present (with these columns having been separately identified, as noted above).

5. The K Value is then multiplied by the reciprocal of the sum of XiV and the syndrome. In practice, using binary numbers, the reciprocal may be obtained by reversing the binary number.

6. The product is separated into a low partial product and a high partial product with the seven least significant digits of the high partial product, serving as a pointer to the M Table from which a modifier value is obtained for adding to the low partial product, as in similar earlier steps of the present system. This is the reciprocal of the correction vector for column Ej, the higher of the two columns which are in error, and identifies the bytes in which the errors in this bit position occur.

7. Of course, any parity errors as indicated by the parity vector not found in column Ej are in column Ei, so that an Exclusive OR function using the Parity Vector and the Ej Correction Vector as inputs, will produce the Ei Correction Vector.

In the implementation of the foregoing, the tables, including the Modifier or M Table, the V and the X,V Tables, and the K Table, are stored in Read Only Memories associated with the microprocessor included in the "Read" circuitry. "Masks" are provided to identify the columns being corrected, and the error correction vectors are supplied to an Exclusive OR circuit concurrently with the disrupted data to selectively invert the erroneous bits.

The present invention provides the advantage of minimizing hardware, and implementing the system using simple algorithms and look-up tables which are convenient for microprocessor implementation. As a result, correction of errors may be accomplished on a real-time basis, and the size, weight and complexity of the tape recorder may be greatly reduced.

Other objects, features, and advantages of the invention will become apparent from a consideration of the following detailed description and from the accompanying drawings.

DETAILED DESCRIPTION

Figure 1:
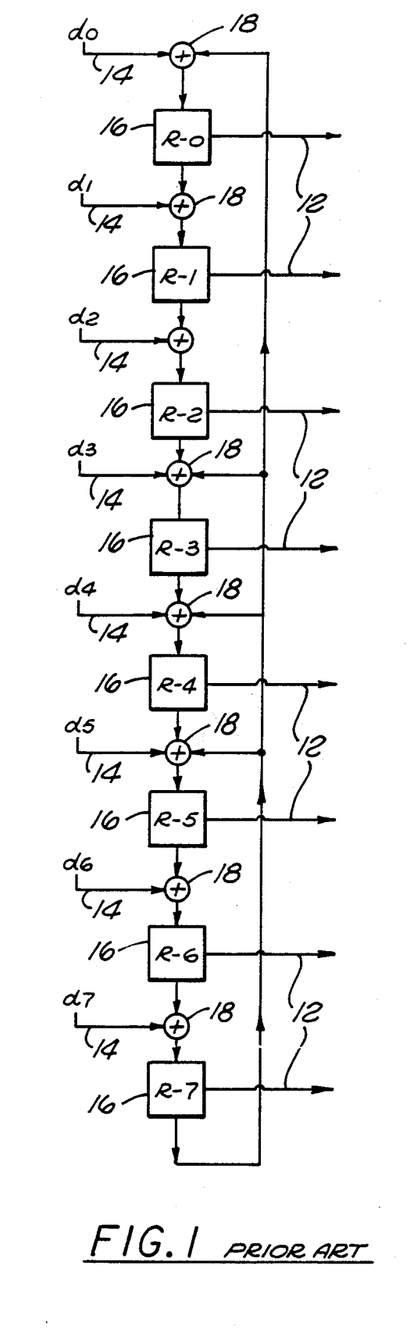
FIG. 1 is a logic block diagram of a feedback shift register employed to develop an error-correcting code for blocks of digital information, in accordance with the prior art.

Referring more particularly to the drawings, FIG. 1 is a feedback shift register of the type disclosed in the IBM article cited hereinabove in which an error correction or ECC byte is formed at the parallel output leads 12, with the correction byte being a function of the seven successive input digital bytes which are applied to the leads 14. A series of registers, which may be bistable multivibrators, or flip-flops, 16 are provided with "EXCLUSIVE OR" circuits 18 at the input to each of the flip-flops. It may be noted that the output from the last flip-flop or register stage 16, also designated R-7, is fed around to the input of the lowest order flip-flop 16 designated R-0 and is also applied to the Exclusive OR circuits 18 at the input of certain of the register stages 16, which are also designated R-3, R-4 and R-5.

In operation, the shift register is initially cleared, and then the first byte of digital information is applied on the input leads 14 to the respective registers 16. With the output from the shift register R-7 being applied to the input of the R-0 stage of the shift register, as well as being fed back to several of the exclusive OR gates 18, the next byte of binary information is applied to the input leads 14. Concurrently, the output from each of the exclusive OR gates 18 is entered into the associated following register stage 16. This step is repeated until all seven input bytes in the block of data have been applied to the input leads 14. Then, the 8-bit byte which appears on leads 12, as the output from the registers 16, designated R-0 through R-7, will be included after the seven bytes of data to provide an 8-bit error correction code, or ECC byte. In addition, all of the eight bytes of data will be checked for parity, and a ninth bit will be provided, constituting the parity check bit for each individual byte of data, including the eighth error correction byte. The result will be a block of digital information including eight "bytes" each including nine binary digits.

The foregoing represents the known prior art arrangements for developing error correction code bytes, as set forth in some detail in the IBM article cited hereinabove.

As noted in the "Background" section of this specification, the present invention involves accomplishing the encoding of the error correction byte, and correcting any disrupted data as the information is withdrawn from the tape, by the use of microprocessor algorithms and "look-up" tables. Important aspects of the present invention involve the steps by which the error correction byte is formed at the encoder, and the steps by which the disrupted data is corrected by the decoder. As the next portion of the present detailed description, therefore, consideration will be given to the general method of accomplishing the foregoing, and one specific example of the correction of disrupted data will be followed through, from start to finish.

In the course of the following description, a number of tables will be set forth, involving information which is generally used for all encoding and decoding, and certain specific numerical examples will also be given.

Several different numerical system will be involved in the course of the description, and these include the decimal system with which we are all familiar, in which ten is the base, the binary system involving only 0's and 1's, in which virtually all computers operate, using the base "2", and the hexadecimal system using the base "16", which is conveniently used for many of the microprocessor related tables, partly for the ease in converting back and forth between the binary and the hexadecimal systems of notation.

For the convenience of persons not entirely conversant with these various schemes of notation, Table No. 1 will set forth decimal numbers, and the corresponding binary and hexadecimal numbers. Incidentally, because hexadecimal numbers need to have a single character represent digits higher than 9, the letters A through F are used to represent the decimal numbers 10 through 15, in the hexadecimal system, as may be seen in the attached Table No. 1.

TABLE NO. 1

Correspondence Between Decimal, Binary, And Hexadecimal Numbers

| DECIMAL NUMBERS | HEXADECIMAL NUMBERS | BINARY NUMBERS |
|---|---|---|
| 0 | 0 | 00000 |
| 1 | 1 | 00001 |
| 2 | 2 | 00010 |
| 3 | 3 | 00011 |
| 4 | 4 | 00100 |
| 5 | 5 | 00101 |
| 6 | 6 | 00110 |
| 7 | 7 | 00111 |
| 8 | 8 | 01000 |
| 9 | 9 | 01001 |
| 10 | A | 01010 |
| 11 | B | 01011 |
| 12 | C | 01100 |
| 13 | D | 01101 |
| 14 | E | 01110 |
| 15 | F | 01111 |
| 16 | 10 | 10000 |
| 17 | 11 | 10001 |
| 18 | 12 | 10010 |
| 19 | 13 | 10011 |
| 20 | 14 | 10100 |
| 21 | 15 | 10101 |
| 22 | 16 | 10110 |
| 23 | 17 | 10111 |
| 24 | 18 | 11000 |
| 25 | 19 | 11001 |
| 26 | 1A | 11010 |

TABLE NO. 2

Modifier or M Table

|    | 0  | 1    | 2  | 3  | 4  | 5  | 6  | 7  |
|----|----|------|----|----|----|----|----|----|
| 00 | 00 | 39   | 72 | 4B | E4 | DD | 96 | AF |
| 08 | F1 | C8   | 83 | BA | 15 | 2C | 67 | 5E |
| 10 | DB | E2   | A9 | 90 | 3F | 06 | 4D | 74 |
| 18 | 2A | 13   | 58 | 61 | CE | F7 | BC | 85 |
| 20 | 8F | B6   | FD | C4 | 6B | 52 | 19 | 20 |
| 28 | 7E | 47   | 0C | 35 | 9A | A3 | E8 | D1 |
| 30 | 54 | 6D   | 26 | 1F | B0 | 89 | C2 | FB |
| 38 | A5 | 9C   | D7 | EE | 41 | 78 | 33 | 0A |
| 40 | 27 | 1E   | 55 | 6C | C3 | FA | B1 | 88 |
| 48 | D6 | EF   | A4 | 9D | 32 | 0B | 40 | 79 |
| 50 | FC | C5   | 8E | B7 | 18 | 21 | 6A | 53 |
| 58 | 0D | >34< | 7F | 46 | E9 | D0 | 9B | A2 |
| 60 | A8 | 91   | DA | E3 | 4C | 75 | 3E | 07 |
| 68 | 59 | 60   | 2B | 12 | BD | 84 | CF | F6 |
| 70 | 73 | 4A   | 01 | 38 | 97 | AE | E5 | DC |
| 78 | 82 | BB   | F0 | C9 | 66 | 5F | 14 | 2D |

TABLE NO. 5

Error Channel Table
K Table

| Ei = | 0 | 1 | 2 | 3 | 4 | 5 | 6 | 7 |
|---|---|---|---|---|---|---|---|---|
| Ej=1 | E8 | 00 | 00 | 00 | 00 | 00 | 00 | 00 |
| Ej=2 | B0 | E9 | 00 | 00 | 00 | 00 | 00 | 00 |
| Ej=3 | >46< | 59 | EB | 00 | 00 | 00 | 00 | 00 |
| Ej=4 | CD | 8C | B2 | EF | 00 | 00 | 00 | 00 |
| Ej=5 | 09 | A3 | 21 | 5D | E7 | 00 | 00 | 00 |
| Ej=6 | A7 | 12 | 7F | 42 | BA | F7 | 00 | 00 |
| Ej=7 | 1E | 77 | 24 | FE | 84 | 4D | D7 | 00 |
| Ej=8 | 39 | 3C | EE | 48 | C5 | 31 | 9A | 97 |

TABLE NO. 3

Vector or V Table

|    | 0   | 1   | 2   | 3   | 4   | 5   | 6   | 7   |
|----|-----|-----|-----|-----|-----|-----|-----|-----|
| 00 | 168 | 000 | 001 | 018 | 002 | 030 | 019 | 048 |
| 08 | 003 | 060 | 031 | 078 | 01A | 083 | 049 | 090 |
| 10 | 004 | 0A8 | 061 | 06D | 032 | 022 | 079 | 0C0 |
| 18 | 01B | 065 | 084 | 0D8 | 04A | 0C6 | 091 | 0F0 |
| 20 | 005 | 108 | 0A9 | 116 | 062 | 0B6 | 06E | 00E |
| 28 | 033 | 0AC | 023 | 0DD | 07A | 120 | 0C1 | 097 |
| 30 | 01C | 10B | 066 | 0F9 | 085 | 0E5 | 0D9 | 138 |
| 38 | 04B | 008 | 0C7 | 13C | 092 | 09C | 0F1 | 03A |
| 40 | 006 | 09A | 109 | 0E3 | 0AA | 12F | 117 | 0B4 |
| 48 | 063 | 0C4 | 0B7 | 020 | 06F | 081 | 00F | 03F |
| 50 | 034 | 123 | 0AD | 150 | 024 | 111 | 0DE | 159 |
| 58 | 07B | 07D | 121 | 10F | 0C2 | 07F | 098 | 12D |
| 60 | 01D | 0E0 | 10C | 15E | 067 | 15B | 0FA | 051 |
| 68 | 086 | 026 | 0E6 | 06A | 0DA | 113 | 139 | 0F6 |
| 70 | 04C | 0AF | 009 | 054 | 0C8 | 152 | 13D | 143 |
| 78 | 093 | 036 | 09D | 0FD | 0F2 | 125 | 03B | 129 |
| 80 | 007 | 13B | 09B | 039 | 10A | 0F8 | 0E4 | 14A |
| 88 | 0AB | 0DC | 130 | 096 | 118 | 115 | 0B5 | 00D |
| 90 | 064 | 0E8 | 0C5 | 100 | 0B8 | 06C | 021 | 0D0 |
| 98 | 070 | 088 | 082 | 0A0 | 010 | 028 | 040 | 058 |
| A0 | 035 | 0FC | 124 | 128 | 0AE | 053 | 151 | 142 |
| A8 | 025 | 069 | 112 | 0F5 | 0DF | 15D | 15A | 050 |
| B0 | 07C | 10E | 07E | 12C | 122 | 160 | 110 | 158 |
| B8 | 0C3 | 01F | 080 | 03E | 099 | 0E2 | 12E | 0B3 |
| C0 | 01E | 03D | 0E1 | 0B2 | 10D | 12B | 15F | 157 |
| C8 | 068 | 0F4 | 15C | 04F | 0FB | 127 | 052 | 141 |
| D0 | 087 | 09F | 027 | 057 | 0E7 | 0FF | 06B | 0CE |
| D8 | 0DB | 095 | 114 | 00C | 13A | 038 | 0F7 | 147 |
| E0 | 04D | 13F | 0B0 | 155 | 00A | 145 | 055 | 0CD |
| E8 | 0C9 | 0CA | 153 | 0CB | 13E | 154 | 144 | 0CC |
| F0 | 094 | 00B | 037 | 146 | 08E | 056 | 0FF | 0CF |
| F8 | 0F3 | 04E | 126 | 140 | 03C | 0B1 | 120 | 156 |

TABLE NO. 4

XV or XiV Table

|     | 0  | 1  | 2  | 3  | 4  | 5  | 6  | 7  |
|-----|----|----|----|----|----|----|----|----|
| 000 | 01 | 02 | 04 | 08 | 10 | 20 | 40 | 80 |
| 008 | 39 | 72 | E4 | F1 | DB | 8F | 27 | 4E |
| 010 | 9C | 01 | 02 | 04 | 08 | 10 | 20 | 40 |
| 018 | 03 | 06 | 0C | 18 | 30 | 60 | C0 | B9 |

TABLE NO. 4-continued

XV or XiV Table

|     | 0  | 1  | 2  | 3  | 4  | 5  | 6  | 7  |
|-----|----|----|----|----|----|----|----|----|
| 020 | 4B | 96 | 15 | 2A | 54 | A8 | 69 | D2 |
| 028 | 9D | 03 | 06 | 0C | 18 | 30 | 60 | C0 |
| 030 | 05 | 0A | 14 | 28 | 50 | A0 | 79 | F2 |
| 038 | DD | 83 | 3F | 7E | FC | C1 | BB | 4F |
| 040 | 9E | 05 | 0A | 14 | 28 | 50 | A0 | 79 |
| 048 | 07 | 0E | 1C | 38 | 70 | E0 | F9 | CB |
| 050 | AF | 67 | CE | A5 | 73 | E6 | F5 | D3 |
| 058 | 9F | 07 | 0E | 1C | 38 | 70 | E0 | E9 |
| 060 | 09 | 12 | 24 | 48 | 90 | 19 | 32 | 64 |
| 068 | C8 | A9 | 6B | D6 | 95 | 13 | 26 | 4C |
| 070 | 98 | 09 | 12 | 24 | 48 | 90 | 19 | 32 |
| 078 | 0B | 16 | 2C | 58 | B0 | 59 | B2 | 5D |
| 080 | BA | 4D | 9A | 0D | 1A | 34 | 68 | D0 |
| 088 | 99 | 0B | 16 | 2C | 58 | B0 | 59 | B2 |
| 090 | 0F | 1E | 3C | 78 | F0 | D9 | 8B | 2F |
| 098 | 5E | BC | 41 | 82 | 3D | 7A | F4 | D1 |
| 0A0 | 9B | 0F | 1E | 3C | 78 | F0 | D9 | 8B |
| 0A8 | 11 | 22 | 44 | 88 | 29 | 52 | A4 | 71 |
| 0B0 | E2 | FD | C3 | BF | 47 | 8E | 25 | 4A |
| 0B8 | 94 | 11 | 22 | 44 | 88 | 29 | 52 | A4 |
| 0C0 | 17 | 2E | 5C | B8 | 49 | 92 | 1D | 3A |
| 0C8 | 74 | E8 | E9 | EB | EF | E7 | F7 | D7 |
| 0D0 | 97 | 17 | 2E | 5C | B8 | 49 | 92 | 1D |
| 0D8 | 1B | 36 | 6C | D8 | 89 | 2B | 56 | AC |
| 0E0 | 61 | C2 | BD | 43 | 86 | 35 | 6A | D4 |
| 0E8 | 91 | 1B | 36 | 6C | D8 | 89 | 2B | 56 |
| 0F0 | 1F | 3E | 7C | F8 | C9 | AB | 6F | DE |
| 0F8 | 85 | 33 | 66 | CC | A1 | 7B | F6 | D5 |
| 100 | 93 | 1F | 3E | 7C | F8 | C9 | AB | 6F |
| 108 | 21 | 42 | 84 | 31 | 62 | C4 | B1 | 5B |
| 110 | B6 | 55 | AA | 6D | DA | 8D | 23 | 46 |
| 118 | 8C | 21 | 42 | 84 | 31 | 62 | C4 | B1 |
| 120 | 2D | 5A | B4 | 51 | A2 | 7D | FA | CD |
| 128 | A3 | 7F | FE | C5 | B3 | 5F | BE | 45 |
| 130 | 8A | 2D | 5A | B4 | 51 | A2 | 7D | FA |
| 138 | 37 | 6E | DC | 81 | 3B | 76 | EC | E1 |
| 140 | FB | CF | A7 | 77 | EE | E5 | F3 | DF |
| 148 | 87 | 37 | 6E | DC | 81 | 3B | 76 | EC |
| 150 | 53 | A6 | 75 | EA | ED | E3 | FF | C7 |
| 158 | B7 | 57 | AE | 65 | CA | AD | 63 | C6 |
| 160 | B5 | 53 | A6 | 75 | EA | ED | E3 | FF |
| 168 | 00 | 00 | 00 | 00 | 00 | 00 | 00 | 00 |

EXAMPLE I-A

ECC Calculation:

```
0 1 0 1 0 0 0 1                   byte 0
  0 1 0 0 0 1 1 1                 byte 1
    0 1 0 0 0 0 0 1               byte 2
      0 1 0 0 1 1 0 1             byte 3
        0 0 0 0 0 1 1 1           byte 4
          1 0 0 1 1 1 0 0         byte 5
            1 1 0 0 1 0 1 0       byte 6
              0 0 0 0 0 0 0 0     byte 7 { Adjust Pad }
─────────────────────────────────
0 1 1 0 1 1 0                     Product High { pointer to M table }
        0 1 1 0 1 1 0 0           Product Low
        1 1 0 0 0 0 1 0         + Modifier { M table }
        ─────────────────────
        1 0 1 0 1 1 1 0         = ECC
```

Parity Calculation:

```
P 7 6 5 4 3 2 1 0
  0 0 1 0 1 0 0 0 1               byte 0
  1 0 1 0 0 0 1 1 1               byte 1
  1 0 1 0 0 0 0 0 1               byte 2
  1 0 1 0 0 1 1 0 1               byte 3
  0 0 0 0 0 0 1 1 1               byte 4
  1 1 0 0 1 1 1 0 0               byte 5
  1 1 1 0 0 1 0 1 0               byte 6
  0 1 0 1 0 1 1 1 0               ECC byte
```

Illustration of Data:

```
                      Ej
                      Ej
Input Data       Disrupted Data    Error Locations
P 7 6 5 4 3 2 1 0   P 7 6 5 4 3 2 1 0   P 7 6 5 4 3 2 1 0
```

EXAMPLE I-A (-continued)

```
0 0 1 0 1 0 0 0 1    0 0 1 0 1 0 0 1 1    . . . . . . . . x .
1 0 1 0 0 0 1 1 1    1 0 1 0 0 0 1 0 1    . . . . . . . . x .
1 0 1 0 0 0 0 0 1    1 0 1 0 0 0 0 1 1    . . . . . . . . x .
1 0 1 0 0 1 1 0 1    1 0 1 0 0 1 1 1 0    . . . . . . . . x x
0 0 0 0 0 0 1 1 1    0 0 0 0 0 0 1 0 0    . . . . . . . . x x
1 1 0 0 1 1 1 0 0    1 1 0 0 1 1 1 0 0    . . . . . . . . .
1 1 1 0 0 1 0 1 0    1 1 1 0 0 1 0 0 1    . . . . . . . . x x
0 1 0 1 0 1 1 1 0    0 1 0 1 0 1 1 1 1    . . . . . . . . x
```

Vector Accumulation:

| | Vector | P 7 6 5 4 3 2 1 0 | |
|---|---|---|---|
| MSB | 1 | 0 0 1 0 1 0 0 1 1 | byte 0 |
| | 1 | 1 0 1 0 0 0 1 0 1 | byte 1 |
| | 1 | 1 0 1 0 0 0 0 1 1 | byte 2 |
| | 0 | 1 0 1 0 0 1 1 1 0 | byte 3 |
| | 0 | 0 0 0 0 0 0 1 0 0 | byte 4 |
| | 0 | 1 1 0 0 1 1 1 0 0 | byte 5 |
| | 0 | 1 1 1 0 0 1 0 0 1 | byte 6 |
| LSB | 1 | 0 1 0 1 0 1 1 1 1 | ECC |
| | | 1 1 1 0 0 0 0 1 = | Vector |

EXAMPLE I-B

Syndrome Calculation:

```
0  1  0  1  0  0  1  1                         byte 0
   0  1  0  0  0  1  0  1                      byte 1
      0  1  0  0  0  0  1  1                   byte 2
         0  1  0  0  1  1  1  0                byte 3
            0  0  0  0  0  1  0  0             byte 4
               1  0  0  1  1  1  0  0          byte 5
                  1  1  0  0  1  0  0  1       byte 6
                     1  0  1  0  1  1  1  1    ECC
0  1  1  0  1  1  1                            Product High { Pointer to M table }
            0  0  1  0  1  1  0  1             Product Low
            1  1  1  1  1  0  1  1             Modifier { M table }
            1  1  0  1  0  1  1  0  =  Syndrome
```

V Multiply & Modify:

| | | | |
|---|---|---|---|
| Vector = 1 1 1 0 0 0 0 1 | | E1 (Hex) | Pointer to V table |
| Pointer from V table = | | 13F (Hex) | Pointer to XiV table |
| Ei = | | 0 | Offset to XiV table |
| Values from XiV table for Pointer = (13F) + Ei = 0 >> 7 | | | |

| Pointer | Ei | Location | XiV Table | Returned value | |
|---|---|---|---|---|---|
| 13F | + 0 = | 13F | | 1 1 1 0 0 0 0 1 = 13F | |
| 13F | + 1 = | 140 | 1 1 1 1 1 0 1 1 | | |
| 13F | + 2 = | 141 | 1 1 0 0 1 1 1 1 | | |
| 13F | + 3 = | 142 | 1 0 1 0 0 1 1 1 | | |
| 13F | + 4 = | 143 | 0 1 1 1 0 1 1 1 | | |
| 13F | + 5 = | 144 | 1 1 1 0 1 1 1 0 | | |
| 13F | + 6 = | 145 | 1 1 1 0 0 1 0 1 | | |
| 13F | + 7 = | 146 | 1 1 1 1 0 0 1 1 | | |
| | | | | 1 1 0 1 0 1 1 0 + | Syndrome |
| | | | | 0 0 1 1 0 1 1 1 = | XiV + Syndrome |

EXAMPLE I-C

K Multiply:

```
XiV + S =           0  0  1  1  0  1  1  1        37 (Hex)
1/(XiV + S) =       1  1  1  0  1  1  0  0        EC (Hex)
K from K table =                                                      1 1 1 0 1 0 0 0  E8 (Hex)
(Ej=1, Ei=0)

1  1  1  0  1  1  0  0                            1/(XiV + S)
                    1  1  1  0  1  1  0  0                         1/(XiV + S)
                       1  1  1  0  1  1  0  0                      1/(XiV + S)
                          0  0  0  0  0  0  0  0                   Zero
                             1  1  1  0  1  1  0  0                1/(XiV + S)
                                0  0  0  0  0  0  0  0             Zero
                                   0  0  0  0  0  0  0  0          Zero
                                      0  0  0  0  0  0  0  0       Zero
                 1  0  1  0  1  1  1                               Product High
                             1  1  1  0  0  0  0  0                Product Low
                                0  1  0  1  0  0  1  1             Modifer { M table }
```

-continued

EXAMPLE 1-C

|   |   |   |   |   |   |   |   |   |   | |
|---|---|---|---|---|---|---|---|---|---|---|
|   |   | 1 | 0 | 1 | 1 | 0 | 0 | 1 | 1 | Intermediate value |
|   | 1 | 0 | 1 | 1 | 0 | 0 | 1 | 1 | 0 | Intermediate value *2 |
| 1 | 0 | 0 | 1 | 1 | 1 | 0 | 0 | 1 |   | Adjust w/g(X) |
|   |   | 0 | 1 | 0 | 1 | 1 | 1 | 1 | 1 | 1/K * ( XiV + S ) |
|   |   | 1 | 1 | 1 | 1 | 1 | 0 | 1 | 0 | Ej vector =K * ( XiV + S ) |

Correction vectors for Data replacement :

```
    Ej vector          Ej channel error
   1 1 1 1 1 0 1 0  =  1 1 1 1 1 0 1 0
                       1 0 1 1 0 0 0 1   +  Column Ej Disrupted Data
                       0 1 0 0 1 0 1 1   =  Column Ej Reconstructed Data
   1 1 1 1 1 0 1 0     Ej vector
   1 1 1 0 0 0 0 1  +  Vector
   0 0 0 1 1 0 1 1  =  Ei vector
     Ei vector         Ei channel error
   0 0 0 1 1 0 1 1  =  0 0 0 1 1 0 1 1
                       1 1 1 0 0 0 1 1   +  Column Ei Disrupted Data
                       1 1 1 1 1 0 0 0   =  Column Ei Rconstructed Data
```

Following the foregoing background, we will now proceed to consider a specific example which will be shown as Examples 1-A, 1-B and 1-C, which together make up a single example. The example will include an original group of seven bytes, each including eight binary digits, or bits, with the successive bytes being designated bytes 0 through 6. These appear at the top of Example No. 1-A following the designation "ECC". The successive bytes are offset with respect to the preceding byte, and the resultant group of binary numbers are added, modulo 2, producing two portions of a "product" which constitute the "product high" and the "product low". The binary number constituting the "product high" is used as an address or "pointer" to the Modifier Table, or M Table, which is included in the present specification as Table No. 2. Now, the M Table is entirely in hexadecimal notation. The pointer which appears toward the top of Example No. 1 may be divided into the right four digits "0110", which would conform to the hexadecimal number 6, and the left-hand three digits to which an additional 0 may be added to the left, making the binary number "0011" which is the hexadecimal number 3. This gives a hexadecimal number 36. Proceeding to the address indicated in the Modifier Table by the pointer 36, the result is the hexadecimal number "C2". Converted to binary, the hexadecimal number C2 is that indicated by the designation "Modifier" toward the top of Example No. I. The Error Correction Code or ECC is obtained by adding the low product and the modifier from the M Table, Modulo 2, obtaining the 8-bit binary number designated ECC in Example No. 1-A. This number is the same as that which would have been obtained using a feedback shift register of the type shown in FIG. 1.

The next step in Example No. 1-A is the formation of the parity bit for each of the 8 bytes (including the ECC byte), with odd parity being used in the present case. Thus, considering the top byte, designated Byte No. 0, below the designation "Parity", it may be seen that Byte No. 0 includes three 1's and five 0's, and accordingly the parity bit is 0, because the number of 1's is already odd. However, where there are an even number of 1's in Byte No. 1, the parity bit for that byte is a "1". Similarly, the remaining bytes, including the ECC byte, have a parity bit added to them. Accordingly, the input data block includes 8 bytes of 9 bits each, including the parity bit for each byte. This is designated "Input Data" in Example 1-A. Following application to the 9-track tape, and retrieval therefrom by suitable magnetic heads, the block of data may have been disrupted, and in Example No. 1, the disrupted data is identified, and the error locations indicated. The error locations are indicated by X's which appear in the two right-hand columns as shown in Example No. 1-A.

The next step, as indicated by the lowermost block in Example 1-A, is to determine the parity error vector. This step essentially involves a recalculation of the parity of each of the bytes of information, and in the event that it is erroneous, a "1" is included in the vector, and if it is correct, a "0" is included in the vector. Thus, with regard to byte 0, in which a single error appears, the vector includes a "1"; in connection with Byte No. 3 including two errors and in Byte No. 2, including no errors, the parity is correct, and accordingly, a "0" appears in the parity error vector column. The resultant eight-bit parity error vector appears at the bottom of Example No. 1-A.

Referring now to Example 1-B, the uppermost algorithm shown in this Example 1-B, is a calculation of the syndrome. This involves addition, modulo 2, of the 8 bytes of digital information, excluding parity bits, and obtaining the "product high" which serves as a pointer or address to the M Table, and a "product low" to which the modifier from the M Table is added. The result is the error correction syndrome. This error correction syndrome is employed to determine the precise location of the errors which were indicated on Example 1-A, but which of course had not yet been located.

Returning to Example 1-B, the next step is to employ the parity vector as a pointer to the Vector Table, which appears as Table No. 3. In the present case, the parity error vector corresponds to the hex number E1, and the Vector Table No. 3 yields a hex value of 13F, which is in turn the "pointer" to the XV Table which is Table No. 4. Prior to using the value in the XV Table, the value of the lowest order of the two columns in which errors are known to occur is added to the pointer or address value. In the present case, the lowest order error column Ei is equal to 0, and therefore, the hex number 13F is used as the pointer to the XV Table. From the XV Table, we obtain the number E1. This happens to be identical to the original error vector, but this is merely a coincidence and would not be true in the normal case, and so the happenstance coincidence has no significance. The binary number from the XV Table, corresponding to the hex number E1 is then added to the syndrome, to give the sum of XiV plus the syndrome.

If the lowest order column of errors Ei happened to be 1, or 2, these numbers would be added to the XV Table Pointer 13F, giving 140 or 141, respectively. If Ei were equal to 1, giving a pointer value of 140, the Table XV gives a hex value of FB equal to the binary number 11111011, as shown in the Example 1-B, between the hex number 140 and the designation Ei=1. Note also that Ei representing the lowest order column containing errors, looks somewhat like the hex number E1, which happens to appear several times in the present example, so care must be exercised to avoid confusion between these two designations.

The next step is to obtain the K value from the K Table, which is set forth in the present specification as Table No. 5. The K Table is set up with the value of Ei as one input and Ej as another input. With Ei being 0 and Ej being 1, the hexadecimal table value is E8, having the value "11101000". This K value is now multiplied by the reciprocal of the sum of the syndrome and XiV. This multiplication is shown at the top of Example 1-C. In practice, it is accomplished by reversing the sum figures, which in binary numbers amounts to taking the reciprocal of the number, and then successively offsetting this binary number and multiplying it by the successive digits of the K value, starting with the most significant digit. Thus, because the first three bits of the K value are "1's", the reciprocal of the indicated sum is repeated three times, offset by one digit on each successive rewriting. The next digit of the K value is 0, and accordingly, a series of eight 0's is inserted as the fourth offset number. This process is continued, and finally the columns are added modulo 2, to produce a "product high" and a "product low". The high product is again employed as a pointer or address to the M Table, and the modifier from the M Table is added to the low product.

The Sum of the modifier and the low product must now be adjusted, as was the ECC in Example I-A. If the MSB of the intermediate value is a 1, then modify the intermediate value with g(X).

Now, the Ej correction vector is equal to the reciprocal of the product of the K value, multiplied by the reciprocal of XiV plus the syndrome, as calculated above. By reference back to the error locations which appear in Example 1-A, it may be seen that the Ej correction vector shown in Example 1-C is indeed correct. As described hereinbelow, this Ej correction vector is combined in an Exclusive OR gate with the disrupted data, to provide the corrected output data.

The final algorithm shown in Example 1-C shows the combining of the Ej correction vector with the overall parity vector by adding the two vectors, modulo 2. The result is the Ei correction vector. Of course, with the assumption that only two channels are in error, all of the errors which were not present in the more significant channel in error Ej, must be present in channel Ei, and accordingly, the final algorithm shown in Example 1-C provides the proper correction vector for column Ei. Further, reference back to Example 1-A shows that the four errors in column Ei are indeed accurately identified. As in the case of Ej, these disrupted bits are also corrected, by the use of an Exclusive OR combining circuit.

It may also be noted that with errors being located in two other columns, for example, with Ei being equal to 2, and Ej being equal to 5, for specific example, then minor changes in the example would be accomplished, as indicated in the foregoing description.

Now that the mathematical basis for the system has been established, we will proceed to consider the remaining Figures of the drawings, including implementing circuitry. From an overall standpoint, given the concepts set forth above, the implementation is not unduly complex, and therefore the various parts of the circuitry will not be covered in minute detail hereinbelow.

Figure 2:
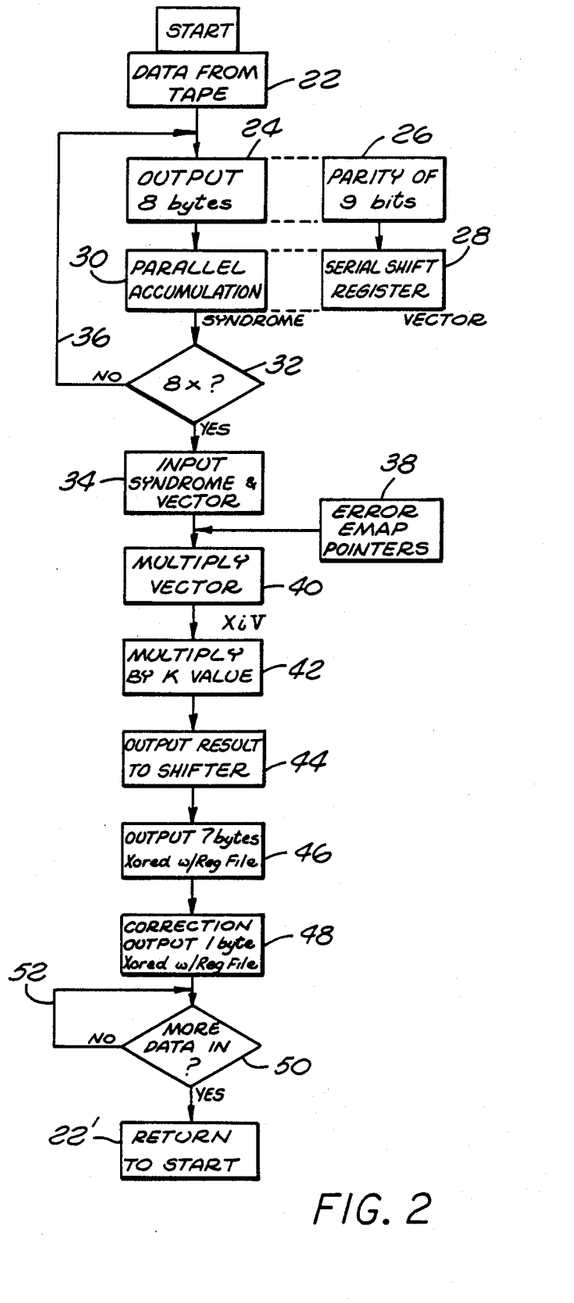
FIG. 2 is a program diagram representing program steps employed in the correction of disrupted data, in accordance with an important aspect of the present invention.

Referring to FIG. 2, this is a step-by-step program diagram referring to the decoding steps which have been considered hereinabove in connection with Example 1-A, B and C, which together make up a single example. In FIG. 2, the uppermost block 22 indicates the receipt of data from the tape, either directly, or following conversion from a run length limited code into binary coding. Block 24 indicates the output of 8 bytes of information, with block 26 indicating the calculation of the parity of each of the 8 bytes of information each containing 9 bits, with block 28 indicating the serial accumulation in a shift register of the parity error vector. Block 30 indicates the parallel accumulation of the data information with each successive byte being shifted by one bit position, to calculate the error syndrome. Block 30 also includes the step of reference to the M Table as part of the calculation of the error syndrome.

Diamond 32 indicates the transfer of the bytes of information, with 8 bytes being required in order to proceed to block 34, and a lesser number of bytes requiring reference back as indicated by line 36, until 8 bytes have been transferred and accumulated. As indicated by block 34, the vector is employed as the input to the V Table, and the error map pointers, separately calculated, as indicated by block 38, provide the identification of the columns Ei and Ej which are in error. This takes us to the XV Table as indicated by block 40. The next step is the multiplication by the K value, determined by the error column input indications relative to Ei and Ej, as indicated by block 42. The output result indicating the error correction vectors for the Ei and Ej columns are transferred to shift registers, as indicated by block 44. Meanwhile, as indicated by block 46, the disrupted data is being stored in an appropriate register file to be synchronously outputed with, and corrected by, the error correction vectors, as indicated by block 48. The diamond 50 inquires as to whether another block of data is arriving, and if not, the recirculation line 52 is followed; however, new data arriving takes us to block 22' which is the start of FIG. 2.

Figure 3:
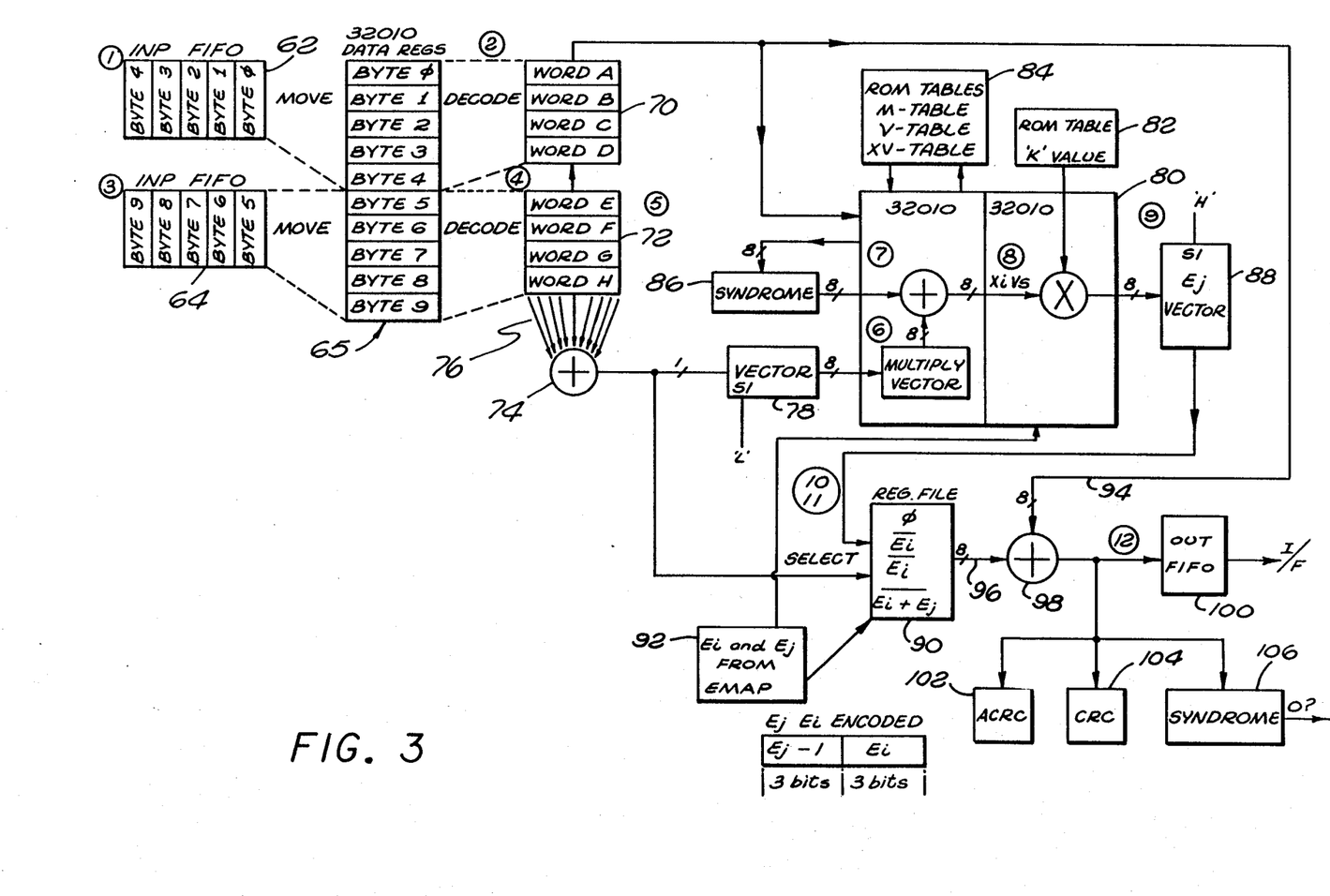
FIG. 3 is a schematic block diagram indicating how the correction steps diagrammed in FIG. 2 may be implemented.

Now, turning to FIG. 3, this is a very simplified diagram of the error correction circuitry. The successive steps in processing and correcting data are noted by encircled numbers 1 through 12. Further, in some cases, the same unit is shown twice for ease in showing the flow of data.

To the left in FIG. 3 are shown two registers 62 and 64 which each include 5 bytes of information coded in run length limited format. These are converted in the microprocessor, which may be a Texas Instrument type 32010 Microprocessor 65 to the 8 bytes of data indicated by blocks 70 and 72. The circle 74 with a plus sign within it represents an exclusive OR circuit and essentially constitutes an odd parity generation circuit, wherein the 9 inputs indicated by the arrows 76 are examined, and an output 0 or 1 is supplied to the vector register 78 depending on the parity of the 9 bit bytes successively supplied to the Exclusive OR circuit 74.

The microprocessor 80 includes a number of Read Only Memory or ROM tables as indicated by the blocks 82 and 84. These tables have been set forth hereinabove in the specification, and are stored in these Read Only Memories. The bytes are supplied to the microcomputer 80, and with the help of the M Tables stored in the ROM 84, the syndrome is calculated and stored, as indicated by the block 86. The microcomputer 80 proceeds to calculate the Ei and Ej correction vectors, and stores them, as indicated by the block 88. The correction register 90 is supplied with an identification of the two columns Ei and Ej which may be in error, from circuitry 92, and is supplied with the Ei and Ej error correction vectors from circuit 88. With the disrupted data being supplied on lead 94 and correction bits being supplied on lead 96, the Exclusive OR circuit 98 corrects the disrupted data bits, and supplies them to the output buffer 100. The blocks 102, 104 and 106 constitute the auxiliary cyclic redundancy check, the cyclic redundancy check, and the syndrome, respectively. The cyclic redundancy check and the auxiliary cyclic redundancy check are conventional circuits which encompass long blocks of data. As mentioned above, in the event that the syndrome is entirely 0's, this indicates the probability that there are no errors in the block of data under consideration.

Figures 4, 8:
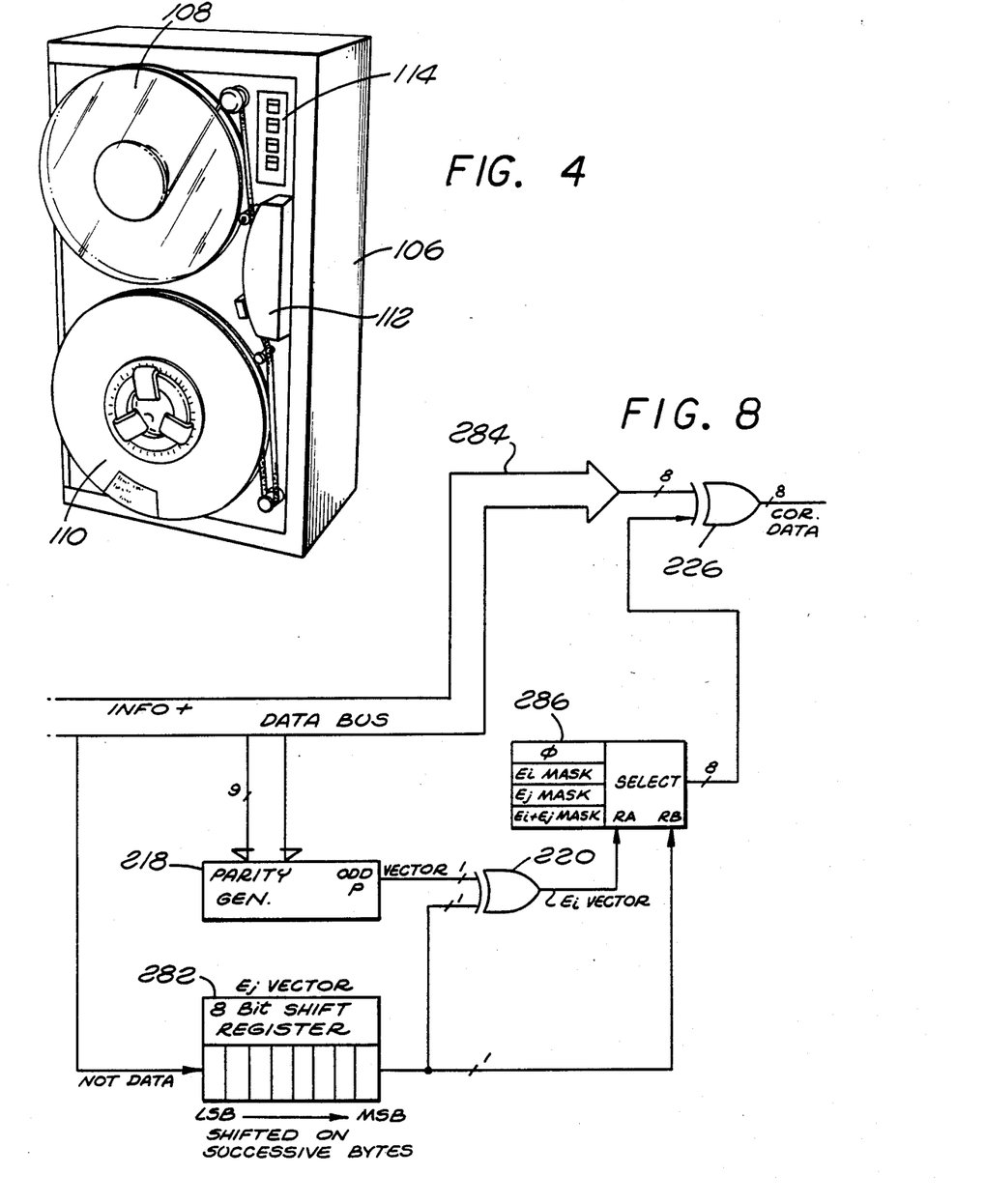
FIG. 4 is an external view of a 9-track tape drive implementing the present invention.
FIG. 8 is a detailed logic circuit diagram of one critical portion of the circuit diagram of FIG. 7 shown in greater detail.

FIG. 4 is an overall view of a ½ inch, nine track tape drive, implementing the principles of the present invention. It includes the housing 106 and two tape reels 108 and 110. The weight of the unit is between 35 and 40 pounds, and the dimensions of the unit are approximately 12.25 inches in width, 21.5 inches in height, and approximately 9 inches in depth.

The "Read" and "Write" heads are included in the assembly 112, and the controls 114 appear in the upper right-hand corner of the front of the tape drive.

Figure 5A:
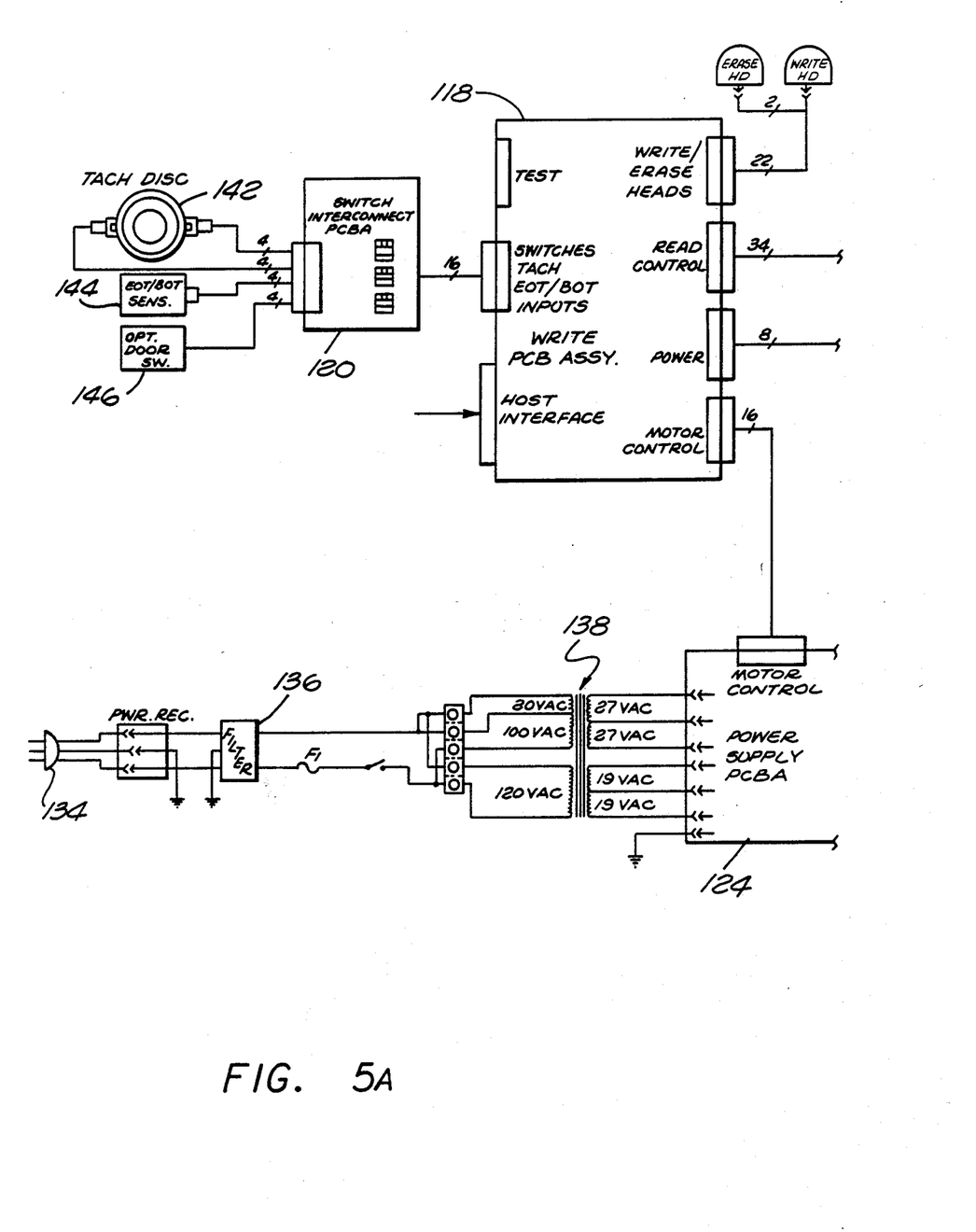
FIGS. 5A and 5B are schematic block circuit diagrams indicating the overall mode of operation of the system of FIG. 4.
Figure 5B:
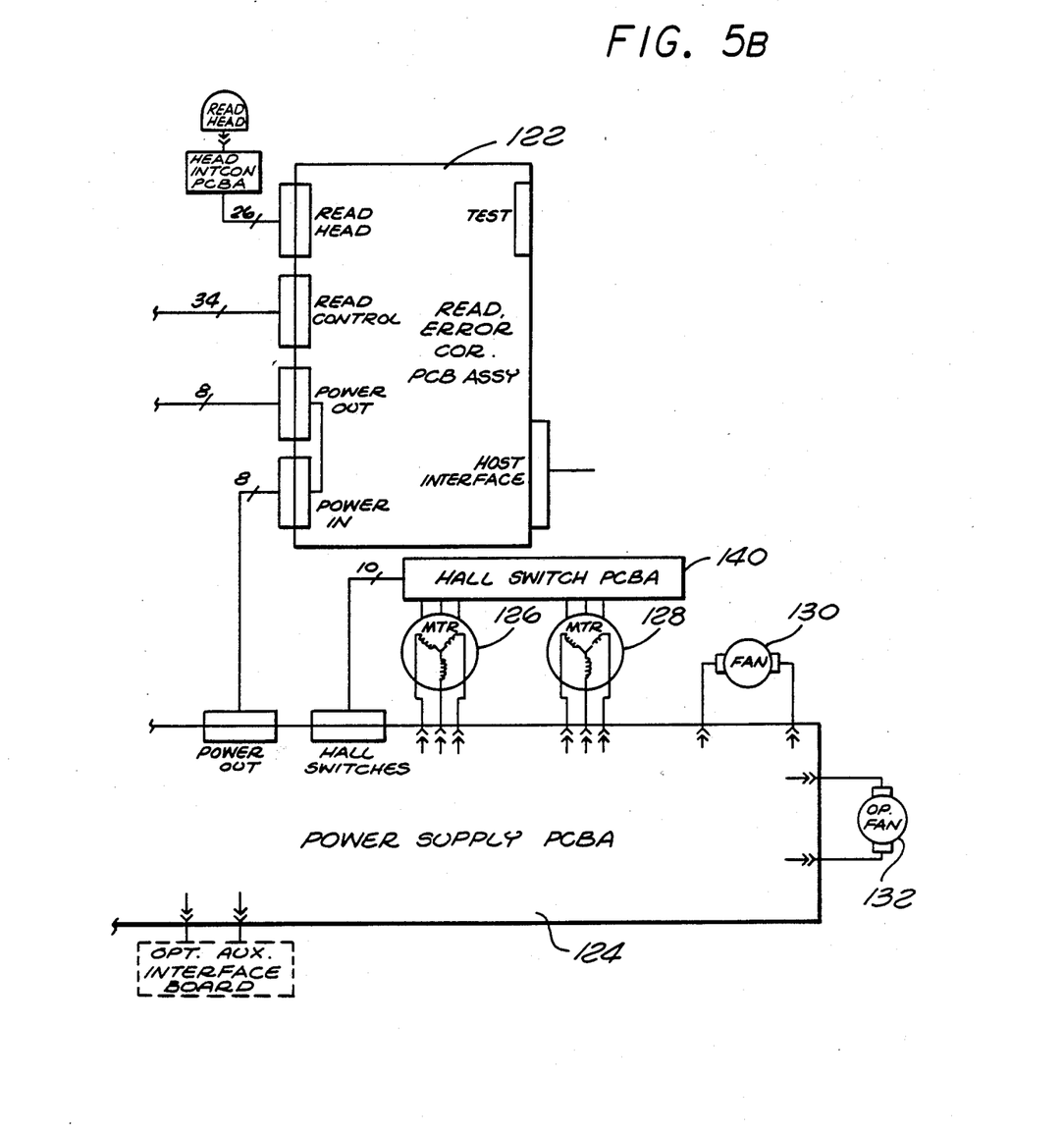

FIGS. 5A and 5B are overall schematic diagrams of the tape drive unit as shown in FIG. 4. More specifically, the circuitry of FIGS. 5A and 5B includes the "Write" printed circuit board assembly 118, the "Switch Interconnect" printed circuit board assembly 120, the "Read" printed circuit board assembly 122, and the "Power Supply" printed circuit board assembly 124. The two drive motors 126 and 128 are coupled to the reels 108 and 110; and the fans 130 and 132 provide cooling for the cabinet 106 in which the tape drive is mounted. Power from alternating current lines is received at plug 134 and is passed through the filter 136 to the transformer 138. The motors 126 and 128 may have permanent magnet armatures, with the switching of the coils in the stator being accomplished in response to signals from Hall effect devices, with the Hall effect printed circuit board assembly being indicated by the block 140. The speed of rotation of the tapes is sensed by the tachometer arrangement indicated at reference numeral 142. An "End-of-Tape" sensing switch is indicated at reference numeral 144 and an optional door interlock switch 146 may also be provided. The remainder of the elements as indicated in FIGS. 5A and 5B are generally conventional, as shown, with the significant differences being as shown in the more detailed circuits included within the printed circuit board assemblies 118 and 122, to be described hereinbelow.

In the following drawings, the circuit of FIG. 6 corresponds substantially to block 118 of FIG. 5A, and the circuit of FIG. 7 conforms substantially to the block 122 as indicated in FIG. 5B.

Figure 6:
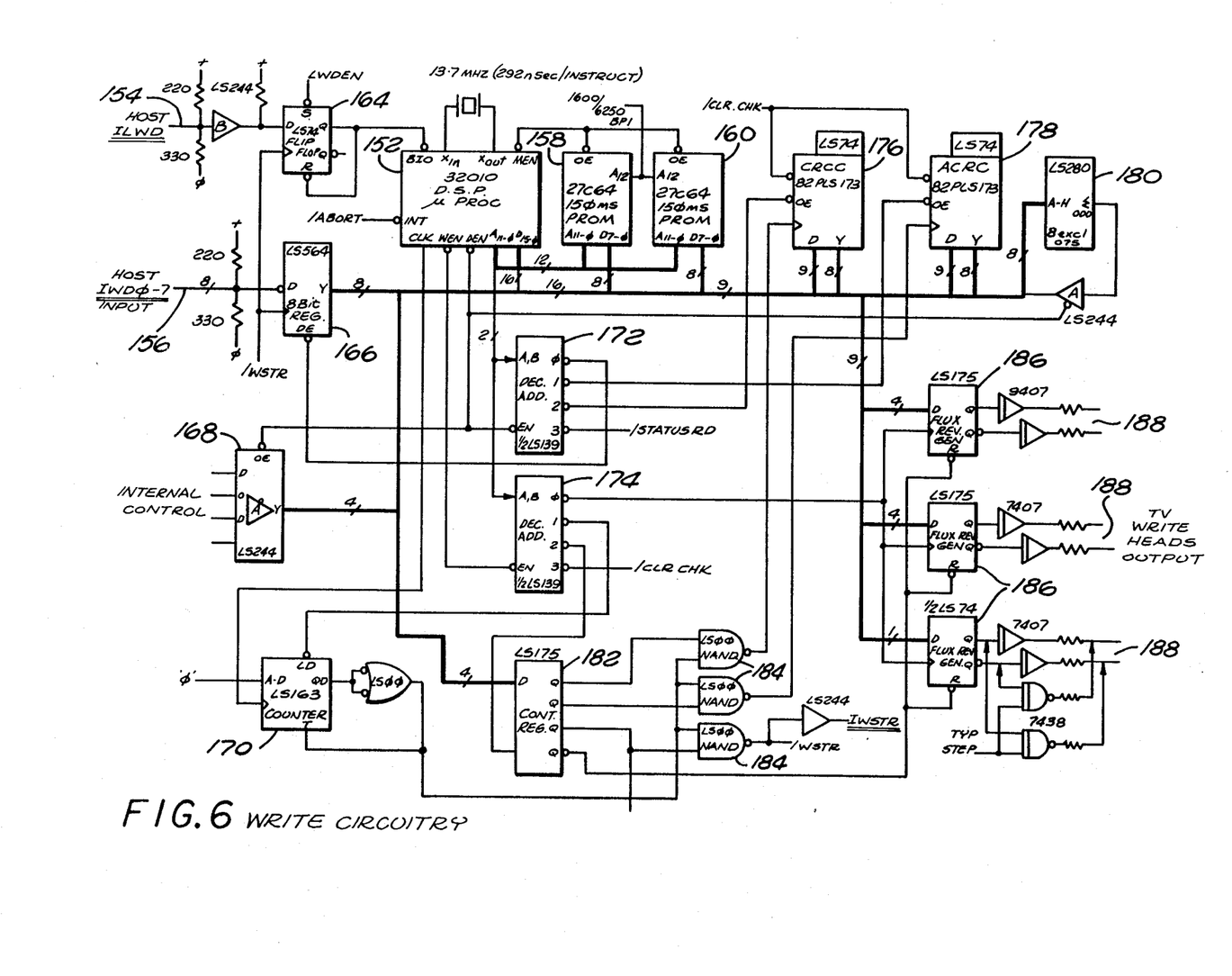
FIG. 6 is a block diagram of the logical "write" portion of the tape drive system.

Referring to FIG. 6, the circuit is controlled by the digital signal processor 152, which may for example be a Texas Instruments Type 32010 Integrated Circuit. Signals from the host computer or data processor are received by the circuit of FIG. 6 on the inputs 154 and 156. The bus 156 receives digital words in parallel on an 8-channel cable. This is indicated by the Arabic number 8 and he slash across the input 156. Signals identifying the last word of a series of digital words sent by the host computer are applied on lead 154. The Programmable Read Only Memories 158 and 160 provide the step-by-step instructions for the digital signal processor 152 so that it will carry out instructions, such as the encoding steps as indicated in Example 1 set forth hereinabove, and also include the M Table in storage.

Other circuits included in FIG. 6 include the flip-flop or bistable multivibrator 164, the 8-bit register 166, and the circuit 168, which provides internal control for the circuit of FIG. 6, the counter 170, and the address decoders 172 and 174. The circuits 176 and 178 generate the check signals for a substantial number of blocks of data, each including a large number of the 8-byte groups of data as discussed in the numerical examples in the present specification. The circuit 180 generates the odd parity bits for each 8-bit byte, as discussed above in connection with Example IA set forth hereinabove. Control register 182 provides signals to the "NAND" circuits 184 and to the flux reversal generators constituting the flip-flops 186. Following amplification from the output of circuits 186, the leads 188 are connected to the "Write" heads for applying data to the 9-track tape.

The ECC byte, as shown in Example 1 which constitutes the 8th byte following 7 bytes of data, is formed by the microprocessor 152 and is fed outwardly from the leads 188 in its proper timed relation with respect to the preceding 7 bytes of information.

Figure 7:
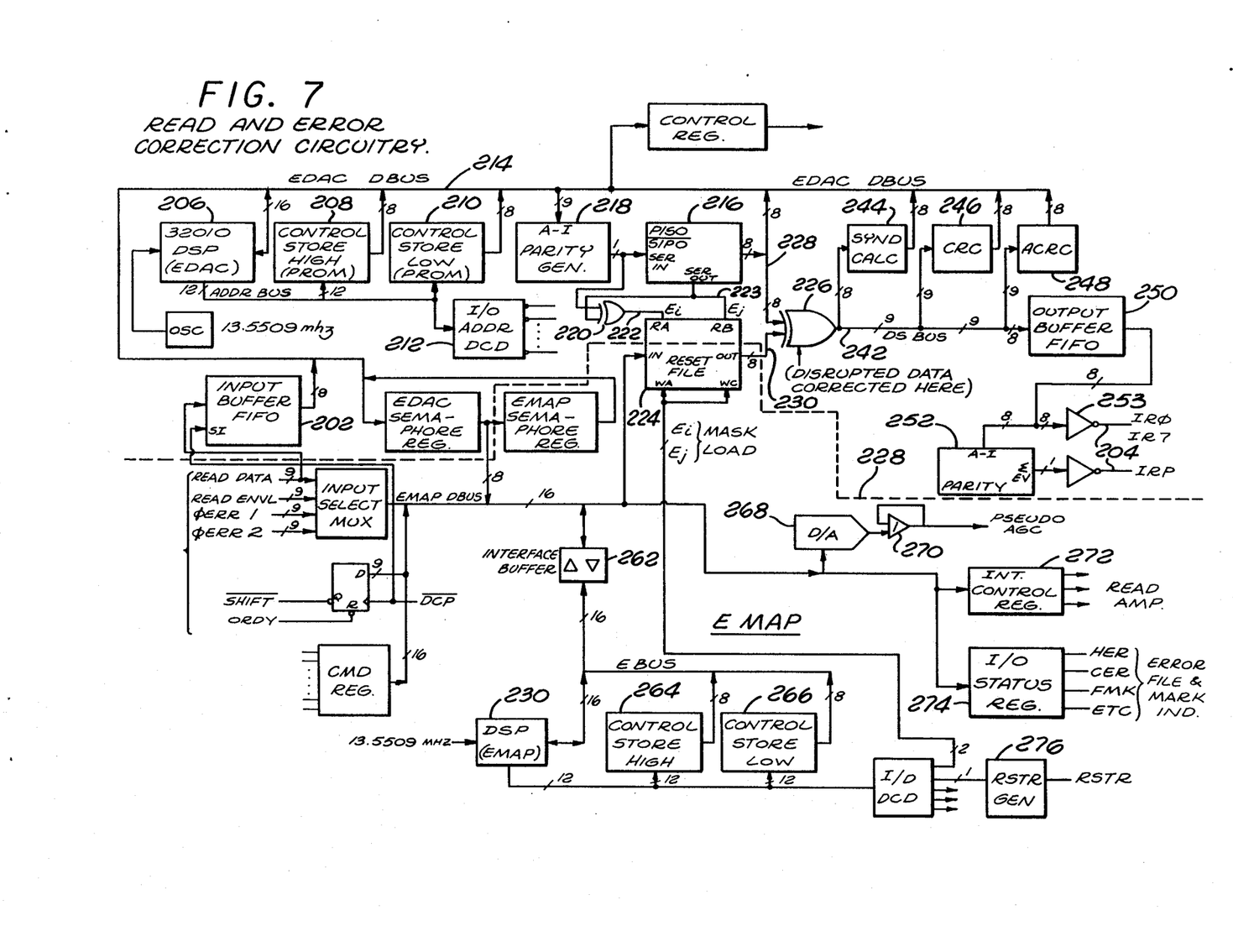
FIG. 7 is a logical circuit diagram of the "read" circuitry and associated error correction system.

Concerning FIG. 7, the nature of the data coming into this circuit, at the input buffer 202 and being transmitted from the circuit of FIG. 7 at the leads 204, as well as the rate of data processing within the circuit of FIG. 7 will be considered. In this regard, data on the tape may, for example, include 9042 flux reversals per inch, and the tape may be travelling at 12.5 inches per second. The data therefore arrives at the circuit of FIG. 7 at the rate of one byte of parallel information every 8.9 microseconds. The parallel output at the leads 204 as shown at the right in FIG. 7, is at the rate of one byte every 12.5 microseconds, or approximately 80 kilobytes per second, which is compatible with the IBM Personal desk computers such as the XT/AT, or compatible computers. Within the circuit of FIG. 7, however, the error detection and correction circuitry, which may be referenced herein as EDAC, operates at a rate of one byte every 900 nanoseconds, or approximately twelve times faster than the input data.

Incidentally, the circuit of FIG. 7 parallels to some extent the circuit of FIG. 3, but is arranged to more accurately indicate the component connections, as compared with the more schematic showing of FIG. 3. The digital signal processor 206 for the EDAC may be a Texas Instruments Type 32010 chip. Associated with the digital signal processor 206 are the two Programmable Read Only Memory circuits 208 and 210. Circuit 212 is the address decoder which provides the signals to interconnect components to transmit and receive data on the bus 214, in accordance with conventional microcomputer data processing practice.

It may be recalled from Example 1, that one of the first steps in the error correction process was to obtain an eight bit error vector. This vector is obtained and stored in the shift register circuitry 216 which receives signals from the parity generator circuit 218 which is essentially a nine input Exclusive OR circuit.

At a later point in the process, the Ej error correction vector is stored in the register 216 and is supplied to the Exclusive OR circuit 220 concurrently with the Ej error vector from the parity generator circuit 218, to produce the Ei error vector at input lead 222 to the circuit 224. In this regard, it may be noted that this step is one of the final steps in Example 1-C. The actual error correction is accomplished in the Exclusive OR circuit 226, and is the combination of input data being coupled on bus 228 to the Exclusive OR circuit 226, along with error correction bits supplied from circuit 224 on leads 230 concurrently with the arrival of disrupted bits on the bus 228.

All of the various tables, including the M Table, the V Table, the XV Table, and the K Table are stored in the Programmable Read Only Memories 208 and/or 210, along with the program steps as set forth in FIG. 2 of the drawings, and in Example 1-A, 1-B and 1-C. Incidentally, it may be noted that the example was arranged so that the same subroutine, involving the offsetting of successive bytes of data, the withdrawing of a number from the M Table as indicated by the high product "pointer", and adding the modifier number to the "low product", is repeated several times in Example 1, for convenience in repeating the subroutine by the digital signal processor 32010.

Extending across FIG. 7 is dashed line 228 which essentially separates the error mapping circuitry in the lower half of the drawing from the remainder of the EDAC circuitry. More specifically, the circuitry above the dashed line 228 relates primarily to the circuitry of implementing the error detection and correction as outlined in Example 1, while the error map circuitry below line 228 involves identifying the two channels Ei and Ej on the tape, which most probably include errors.

The error map circuitry has its own digital signal processor 230 which may also be a Texas Instruments Type 32010 chip. The mode of operation of the error mapping circuitry is known per se, and is merely shown here for completeness, and in order to obtain an identification of the Ei and Ej channels which are in error. The inputs to the circuit include signals representing the data, the input signal envelopes, from each channel, and the phase errors for each channel. These are analyzed in a systematic manner by the digital signal processor, with particular attention being given to the magnitude of the phase errors for each channel, to determine whether they are within prescribed set limits. The two channels which are most likely to include disrupted data, are identified, and this information is supplied to the circuit 224, which stores the error mask signals identifying these two channels Ei and Ej, so that corrections may only be made to these two channels, in accordance with the signals supplied on lead 222 identifying the Ei errors and on lead 223 identifying the Ej errors.

Now, returning to the upper portion of the circuitry, the corrected data is supplied on the bus 242 to the syndrome calculator 244, to the cyclic redundancy code circuit 246 and to the auxiliary cyclic redundancy code circuit 248, as well as to the output buffer circuit 250.

From the output buffer circuit 250, which is a "first-in, first-out" buffer circuit, the signals are supplied to the line driver 253 and out through the output circuits 204 to the host computer. The circuit 252 supplies a parity bit on the lower lead 204 to accompany each byte supplied on the upper bus 204. The output buffer 250 is required to accommodate the higher speed mode of operation of the EDAC circuitry of FIG. 7, and the lower speed desired at the interface with the desk top computer, as mentioned hereinabove. Incidentally, the syndrome calculator 244 may be of the old fashioned type as shown in FIG. 1 of the drawings, and it is to be expected, if the error correction circuitry is operating correctly, that the output will be zero, indicating that there are no errors. The circuits 246 and 248 are conventional, and are known per se, involving redundancy codes extending over many groups of data, and are not directly involved with the present invention. Circuit 246 is the cyclic redundancy code circuit and the block 248 is the auxiliary cyclic redundancy code circuit.

Concerning additional circuits in the error mapping section below the dashed line 228, circuit 262 is an interface buffer. The storage circuits 264 and 266 are associated with the digital signal processor 230 and provide the successive steps of operation of the error mapping circuitry. The digital-to-analog converter 268 and its associated amplifier 270 provides the "pseudo" automatic gain control used to set the threshold levels of the read amplifiers. Circuit 272 is the control register for the read amplifiers. Block 274 represents the input/output status registers, and includes outputs indicating hard errors, correctable errors, and, one output "FMK" indicating the file mark, which represents the beginning of an extended block of data representing a particular file. Block 276 represents the read strobe generator. The remaining circuitry not specifically mentioned hereinabove, is generally conventional, and may be implemented in a number of ways, not critical to the present invention which is primarily related to the encoding and the error correction circuitry, discussed at length in connection with Example 1 hereinabove.

Referring now to FIG. 8 of the drawings, this figure shows the circuitry relating to the actual correction in greater detail. Some of the circuits shown in FIG. 7 are also shown FIG. 8. Thus, for example, the Exclusive OR circuit 220 where the Ei vector is combined with the parity vector from circuit 218 and from the shift register 282 where the Ej vector is stored, is shown in FIG. 8. Also, note the final Exclusive OR circuit 226, where the final correction of disrupted data from the data bus 284 is corrected. Incidentally, it may be noted that there are actually eight Exclusive OR circuits 226, one for each of the eight parallel bits of data arriving on the data bus 284. Within the circuit 286, the Ei and Ej masks are set up for a large number of bytes of information, based on the error map analysis, as discussed in connection with FIG. 7 of the drawings. In the actual correction process, it may be noted that as each byte of information arrives at the eight Exclusive ORs indicated by the reference numeral 226, only two of these Exclusive ORs are selected by the masks, for possible correction by the successive bits of the Ei and Ej vectors, which are formed or supplied with one bit from each vector arriving concurrently with one byte of data from the bus 284. In this way, the individual disrupted bits, as indicated in Example 1, are corrected.

In conclusion, it is to be understood that the foregoing detailed description and the accompanying drawings relate to one illustrate embodiment of the invention. Various changes and modifications may be made without departing from the spirit and scope of the invention. Thus, by way of example and not of limitation, a different type of feedback shift register configuration and algorithm could be the basis for the system, in which case, of course the tables would be appropriately modified to reflect the different mathematical algorithms necessary to implement the different feedback paths in the different feedback shift register hardware implementation. In addition, other logic circuitry than that shown and described above, could be used to implement the various mathematical algorithms. Further, if desired, the encoding could be accomplished using a feedback shift register, and the decoding by the method and system of the present invention. Also instead of using eight bit words or bytes of data, words including a different number of bits could be used. Accordingly, the present invention is not limited to the precise circuitry shown in the drawings, and described in the foregoing detailed description.

What is claimed is:

1. An error detection and correction system for nine track tape recorders comprising:
    means for receiving successive bytes of digital information each including eight bits;
    means for calculating a parity correction bit for each said byte of data and adding it to said eight bits to form a series of nine bit bytes of binary information;
    a microcomputer;
    means for forming a cyclic redundancy code for a block of data bytes, in the form of an error correction check byte, by offsetting successive bytes in said block of data bytes by one bit, and adding the digital data, to obtain a product high and a product low, using the address indicated by the product high as a pointer to retrieve a Modifier from a stored table associated with the microcomputer, and adding the modifier to the product low to form an error correction check (ECC) byte;
    means for recording the block of data bytes along with the ECC byte on a nine track tape;
    means for retrieving the block of data and ECC byte from the tape;
    means for calculating a parity check error vector by checking the parity of each byte in the block of data and the ECC byte;
    means for calculating the error syndrome by repeating the steps for forming the ECC byte, but including the ECC byte;
    means for identifying two of the nine columns or tracks Ei and Ej which most probably contain errors;
    means for calculating the error correction vectors for each of columns Ei and Ej, using the error vector, the error syndrome, an identification of the two channels Ei and Ej, and Look-Up Tables stored in memory associated with said microcomputer; and
    means for supplying the disrupted data to an error correction circuit concurrently with data representing the error correction vectors, to correct the disrupted data to its input format.

2. A system as defined in claim 1 wherein said system includes means for correcting errors on a real-time, on-line basis.

3. A system as defined in claim 1 wherein said system includes means for performing the offset multiplication and addition algorithm as set forth in claim 1 at least three times.

4. A system as defined in claim 1 wherein said means for calculating error correction vectors includes digital storage containing the Modifier Table; a Y Table having as its input the error vector, a K Table having as its input the Ei and Ej column identifications; means for combining the output from the Y Table with the error syndrome to form a vector/syndrome value; means for multiplying the Vector Syndrome Value by the output from the K Table to yield a first column error vector; and means for combining the parity error vector with said first column error vector to provide the second column error vector.

5. A system as defined in claim 4 wherein said Y Table is a composite table which includes two subtables, a V Table and a XiV Table, and wherein the output from the V Table is incremented by the number of the Ei channel to provide a pointer or address to the XiV Table, yielding the desired output from the composite Y Table.

6. A system as defined in claim 1 wherein said means for calculating the error correction vectors includes a digital signal processor and associated read only memories in which said tables are stored.

7. A system as defined in claim 6 wherein means are provided for operating said digital signal processor at a speed which is many times faster than the rate at which information is retrieved from said tape.

8. A system as defined in claim 7 including input buffer means for receiving possibly disrupted data from said tape and output buffer means for storing corrected output data prior to transmitting it to an associated host computer.

9. An error detection and correction system for parallel words of binary information employing a feedback shift register type of error correction checking scheme, comprising:
    means for receiving successive words of digital information each including at least several bits and forming a block of data;
    means for calculating a parity correction bit for each said word of data and adding it to said word to form a series of longer words of binary information;
    a microcomputer;
    means for forming an error correction check (ECC) word conforming to said error correction checking scheme;
    means for transmitting said data including said ECC check word so that some of said data may be disrupted;
    means for retrieving the block of data and the ECC word;
    means for calculating a parity check error vector by checking the parity of each word in the block of data and the ECC word;
    means for calculating the error syndrome by offsetting successive words in said block of data words and said ECC word, by one bit, and adding the digital data, to obtain a product high and a product low, using the address indicated by the product high as a pointer to retrieve a Modifier from a stored table associated with the microcomputer, and adding the Modifier to the product low to form an error correction syndrome;

means for identifying two of the word bit positions or channels Ei and Ej which most probably contain errors;

means for calculating the error correction vectors for each of channels Ei and Ej, using the parity check error vector, the error syndrome, an identification of the two channels Ei and Ej, and Look-Up Tables stored in memory associated with said microcomputer; and means for supplying the disrupted data to an error correction circuit concurrently with data representing the error correction vectors, to correct the disrupted data to its input format.

10. A system as defined in claim 9 wherein said means for calculating error correction vectors includes digital storage containing the Modifier Table; a Y Table having as its input the error vector, a K Table having as its input the Ei and Ej channel identifications; means for combining the output from the Y Table with the error syndrome to form a vector/syndrome value; means for multiplying the Vector Syndrome Value by the output from the K Table to yield a first channel error vector; and means for combining the parity error vector with said first channel error vector to provide the second channel error vector.

11. A system as defined in claim 9 wherein said system includes means for correcting errors on a real-time, on-line basis.

12. An error detection and correction method for nine track tape recorders comprising:
receiving successive bytes of digital information each including eight bits;
calculating a parity correction bit for each said byte of data and adding it to said eight bits to form a series of nine bit bytes of binary information;
forming a cyclic redundancy code for a block of data bytes, in the form of an error correction check byte, by offsetting successive bytes in said block of data bytes by one bit, and adding the digital data, to obtain a product high and a product low, using the address indicated by the product high as a pointer to retrieve a Modifier from a stored table associated with the microcomputer, and adding the modifier to the product low to form an error correction check (ECC) byte;
recording the block of data bytes along with the ECC byte on a nine track tape;
retrieving the block of data and ECC byte from the tape;
calculating a parity check error vector by checking the parity of each byte in the block of data and the ECC byte;
calculating the error syndrome by repeating the steps for forming the ECC byte, but including the ECC byte;
identifying two of the nine columns or tracks Ei and Ej which most probably contain errors;
calculating the error correction vectors for each of columns Ei and Ej, using the error vector, the error syndrome, the parity check error vector, and stored Look-Up Tables; and
supplying the disrupted data to an error correction circuit concurrently with data representing the error correction vectors, to correct the disrupted data to its input format.

13. A method as defined in claim 12 wherein the calculating of the error correction vectors includes using the modifier Table; a Y Table having as its input the error vector, a K Table having as its input the Ei and Ej column identifications; combining the output from the Y Table with the error syndrome to form a vector/syndrome value; multiplying the Vector Syndrome Value by the output from the K Table to yield a first column error vector; and combining the parity error vector with said first column error vector to provide the second column error vector.

14. A method as defined in claim 12 wherein correction of errors is accomplished on a real-time, on-line basis.

15. An error detection and correction system for parallel bytes of information employing a feedback shift register type of error correction checking scheme, comprising:
means for receiving successive bytes of digital information each including eight bits;
a microcomputer;
means for forming a cyclic redundancy code for a block of data bytes, in the form of an error correction check byte, by offsetting successive bytes in said block of data bytes by one bit, and adding the digital data, to obtain a product high and a product low, using the address indicated by the product high as a pointer to retrieve a Modifier from a stored table associated with the microcomputer, and adding the modifier to the product low to form an error correction check (ECC) byte, conforming to said error correction checking scheme;
means for calculating parity correction bits for selected bits of said data and adding them to said bytes of data to form an enlarged block of data;
means for transmitting said data so that some of said data may be disrupted;
means for retrieving the block of transmitted data;
means for calculating a parity check error vector by checking the parity of each parity check bit in the block of data;
means for calculating the error syndrome by repeating the steps for forming the ECC byte, and combining the result of that process with the ECC byte;
means for identifying two of the nine columns or tracks Ei and Ej which most probably contain errors;
means for calculating the error correction vectors for each of columns Ei and Ej, using the parity check error vector, the error syndrome, an identification of the two channels Ei and Ej, and Look-Up Tables stored in memory associated with said microcomputer; and
means for supplying the disrupted data to an error correction circuit concurrently with data representing the error correction vectors, to correct the disrupted data to its input format.

16. A system as defined in claim 15 wherein said means for calculating error correction vectors includes digital storage containing the Modifier Table; a Y Table having as its input the error vector, a K Table having as its input the Ei and Ej column identifications; means for combining the output from the Y Table with the error syndrome to form a vector/syndrome value; means for multiplying the Vector Syndrome Value by the output from the K Table to yield a first Ei column error vector; and means for combining the parity error vector with said first Ei column error vector to provide the second Ei column error vector.

17. A system as defined in claim 15 wherein said system includes means for correcting errors on a real-time, on-line basis.

18. A system as defined in claim 15 wherein said means for calculating the error correction vectors includes a digital signal processor and associated read only memories in which said tables are stored.

19. A system as defined in claim 18 wherein means are provided for operating said digital signal processor at a speed which is many times faster than the rate at which information is retrieved from said tape.

20. An error detection and correction method for nine track tape recorders comprising:

receiving successive bytes of digital information each including eight bits;

calculating a parity correction bit for each said byte of data and adding it to said eight bits to form a series of nine bit bytes of binary information;

forming a cyclic redundancy code for a block of data bytes, in the form of an error correction check byte, by offsetting successive bytes in said block of data bytes by one bit, and adding the digital data, to obtain a product high and a product low, using the address indicated by the product high as a pointer to retrieve a Modifier from a stored table associated with the microcomputer, and adding the Modifier to the product low to form an error correction check (ECC) byte;

transmitting the block of data bytes along with the ECC byte so that some of the data may be disrupted;

retrieving the block of data and ECC byte;

calculating a parity check error vector by checking the parity of each byte in the block of data and the ECC byte;

calculating the error syndrome by repeating the steps for forming the ECC byte, and combining the result of that process with the ECC byte;

identifying two of the nine columns or tracks Ei and Ej which most probably contain errors;

calculating the error correction vectors for each of columns Ei and Ej, using the parity check error vector, the error syndrome, an identification of columns Ei and Ej, and stored Look-Up Tables; and supplying the disrupted data to an error correction circuit concurrently with data representing the error correction vectors, to correct the disrupted data to its input format.

* * * * *